Aug. 13, 1957 K. M. MacDOWELL 2,802,898

FAILURE INDICATION IN RELAY COMMUNICATION SYSTEMS

Filed Nov. 5, 1954

INVENTOR
KENNETH M. MACDOWELL
BY Elmer J. Gorn
ATTORNEY 2,802,898

FAILURE INDICATION IN RELAY COMMUNICATION SYSTEMS

Kenneth M. MacDowell, West Newton, Mass., assignor to Raytheon Manufacturing Company, Waltham, Mass., a corporation of Delaware Application November 5, 1954, Serial No. 467,172

17 Claims. (Cl. 178—5)

This invention relates to means for indicating which relay station has failed in multistation relay systems, especially those for the transmission of television signals.

Where many unattended stations are used for relaying signals between attended terminating stations, when the signal fails it becomes important for the operator at the terminal receiver of the relay chain to know which link in the chain has failed as soon after the failure as possible so that steps may be taken to correct the condition in the shortest possible time. This is accomplished by the apparatus of the invention by causing the video amplifier of the receiver in each relay to oscillate at a characteristic frequency, preferably at the horizontal repetition rate of the television signal or at a harmonic of this frequency for each station. This oscillation is used to modulate the output of the transmitter of the first station in the chain that is not receiving a signal. This oscillation after passage through intervening stations arrives at the terminal receiver and when applied to the monitor produces a characteristic pattern of black and white bars on its screen. The number of black and white vertical bars indicates the station that has failed. This indication may also be given by applying the detected video signal to a plurality of circuits, each series resonant at the characteristic frequency for one of the stations. A neon light is placed across the capacitor of the circuit and supplied with biasing potential so that it lights when the frequency representative of its station appears at the receiver. The receivers are made to oscillate by applying the output of the video amplifier to its input through a control tube that has the A. G. C. voltage applied to its control grid to bias it off except when the incoming signal drops below a useful level. Negative squelch voltage is obtained from the final stage of the video amplifier and applied to a stage in the IF amplifier other than that used to obtain A. G. C. voltage so that no noise is introduced into the video amplifier and the IF amplifier while the video amplifier is oscillating.

The foregoing and other advantages, objects, and features of this invention will be better understood from the following description taken in conjunction with the accompanying drawing in which.

Figs. 4 *a, b,* and *c* are diagrammatic representations of the pattern formed on the face of the monitor screen by signals produced by representative receivers using the circuits of the invention.

Figure 1:
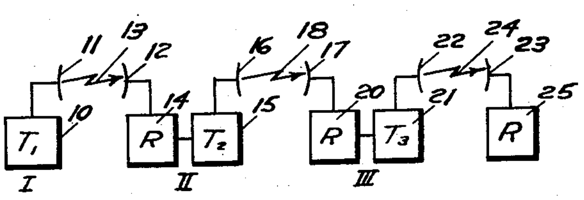
Fig. 1 is a block diagram of a relay chain in which this invention may be used.

In Fig. 1 the reference numeral 10 designates the initial transmitter that supplies radio frequency energy to an antenna 11. This energy is propagated to a second antenna 12 as indicated by the arrow 13. Energy received by the antenna 12 is fed to the input of a receiver 14 and after detection is used to modulate a second transmitter 15 that supplies radio frequency energy to a third antenna 16. Energy propagated by the antenna 16 is received by a fourth antenna 17 as indicated by the arrow 18. As before, this energy is detected by a second receiver 20 and used to modulate a third transmitter 21 that in turn feeds energy to a fifth antenna 22 that propagates it out to a sixth antenna 23 as indicated by the arrow 24. The energy received by the antenna 23 is detected in a terminal receiver 25.

Figures 2, 3, 4A, 4B, 4C:
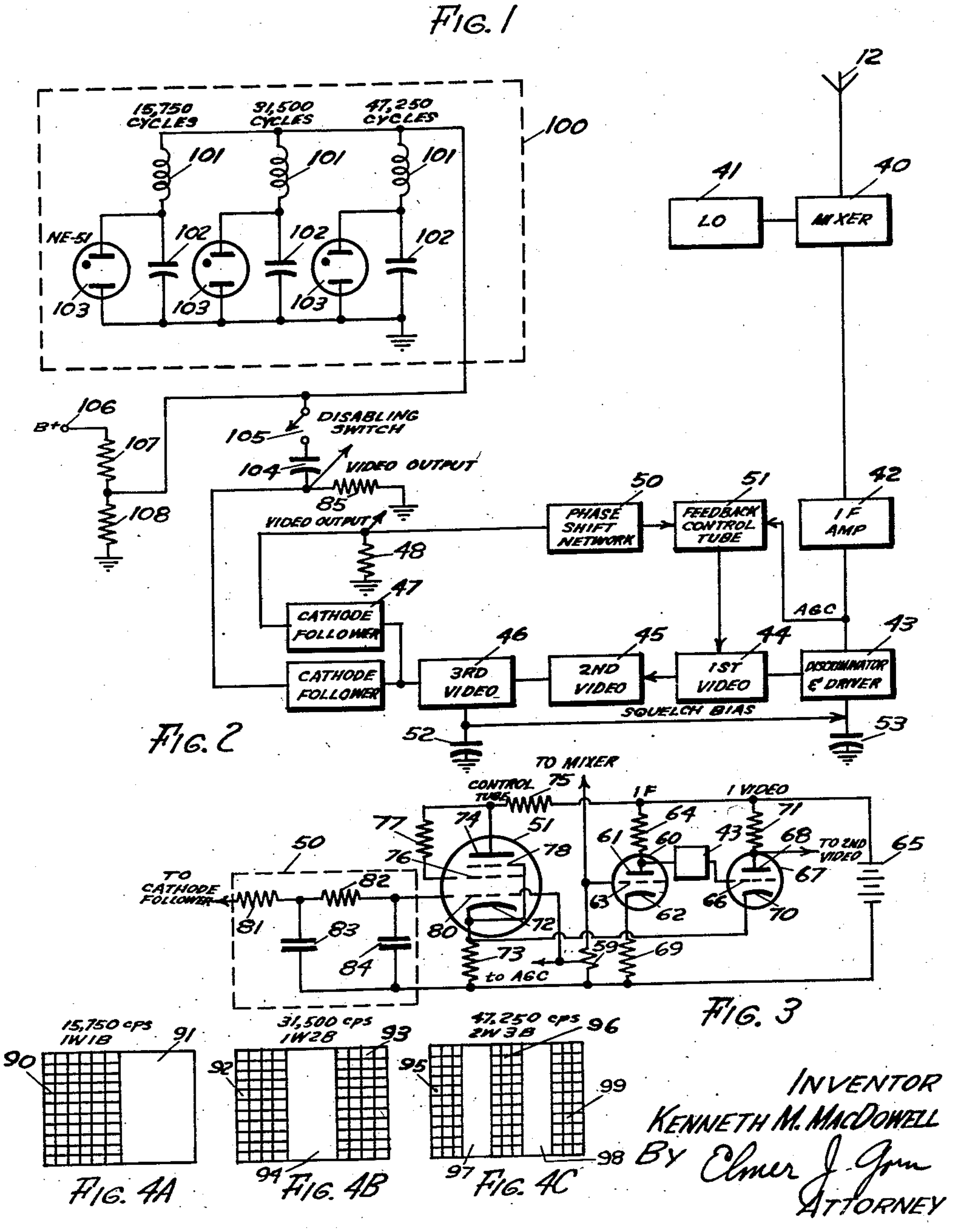
Fig. 2 is a block diagram of the circuit of a receiver embodying the invention.
Fig. 3 is a schematic diagram of a portion of the circuit of Fig. 2.

Fig. 2 gives a block diagram of any one of relay receivers 14, 20 or 25. Energy received by the antenna 12 is applied to a mixer 40 as is also energy from a local oscillator 41. The resulting intermediate frequency energy is amplified in amplifier 42 and after amplification and limiting is detected in a discriminator 43 of any of the well-known designs. The output of the discriminator is successively amplified in a first 44, second 45, and a third 46 video amplifier and after passage through a cathode follower 47 is applied to the monitor (not shown). The output of the cathode follower 47 is also applied across a shunt resistor 48 to a phase shifter network 50 that is preferably of the tapered type. The design of the phase shifter is determined by the frequency at which it is desired to have the particular video amplifier chain oscillate. The phase shifted output of the video amplifier is applied to a feed-back control tube 51 which is biased to cut-off by an A. G. C. voltage obtained from one stage of the IF amplifier when a signal is being received that exceeds a predetermined value, such as one microvolt, at the input to the receiver. In the absence of such a signal the A. G. C. voltage drops sufficiently to permit the control tube 51 to conduct and pass the phase shifted signal to the input of the first stage 44 of the video amplifier. The result is to cause the video amplifier to oscillate. In order to prevent noise from the earliest stages of the receiver from appearing in the video amplifier, a negative potential is developed across the capacitor 52 in the third stage 46 of the video amplifier. The grid of this amplifier carries current during the oscillations. This is the current that builds up the negative voltage across the capacitor 52 and is applied across a capacitor 53 to the grid of a stage of the IF amplifier other than that at which the A. G. C. voltage is developed. In a representative receiver the driver of the discriminator was chosen for this purpose.

Further details of the circuit of Fig. 2 are shown in the schematic diagram of Fig. 3 in which the reference numeral 60 designates a tube constituting a stage in the IF amplifier 42. This tube 60 has a plate 61, a cathode 62 and a grid 63. The grid 63 is coupled to the output of the mixer 40 and connected to the cathode 62 through resistors 59 and 69. The plate is connected through a resistor 64 to the positive terminal of a source 65 of potential. The plate 61 is also coupled to the input to the driver for the discriminator 43 and after discrimination to the grid 66 of a tube 67 in the first stage 44 of video amplification. The tube 67 has a plate 68 and a cathode 70. The plate 68 is connected to the source 65 through a resistor 71 and also to the input of the second video amplifier 45. The cathode 70 is connected to the cathode 72 of the control tube 51 that is also connected to the negative terminal of the source 65 through a resistor 73. The plate 74 of the tube 51 is connected to the positive terminal of the source 65 through a resistor 75. The screen grid 76 of the tube 51 is also connected to the source 65 through a resistor 77 and the resistor 75. The supressor grid 78 is connected to the cathode 72. The control grid 80 is connected to the phase shifting network 50 comprising series resistors 81 and 82 and shunt capacitors 83 and 84. The phase shifting network can be of any of the well-known types instead of that shown and preferably should be tapered. The grid 80 is also connected to a tap on the resistor 59 and to a source of A. G. C. voltage so that this A. G. C voltage is applied to both the control tube 51 and a stage of the IF amplifier 42.

The signal that can be made to appear upon the screen of the monitor connected across either the resistor 48 or the resistor 85 is indicated schematically in Figs. 4, *a, b,* and *c.* When the receiver of the first relay receives no signal, its control tube is no longer blocked by the A. G. C. voltage and conducts, permitting phase shifted feedback from the output of the video amplifier to be applied to the input of this amplifier in proper phase to cause oscillation. The phase shifter is most conveniently designed to give a frequency of oscillation equal to the horizontal repetition rate of the television signal being transmitted or at a harmonic of this frequency. These oscillations, when applied to a monitor of any convenient design at the first relay receiver 14, produce one dark vertical bar 90 and one light vertical bar 91 as shown in Fig. 4*a*. This signal modulates the transmitter 15 of this relay and a monitor connected to the video output of the receiver of any of the succeeding relays and the terminal station shows the same pattern. The phase shifter in the receiver of the second relay is adjusted so that the video amplifier oscillates at twice the horizontal repetition rate to give a pattern of two black bars 92 and 93 and a white bar 94 as shown in Fig. 4*b*. Similarly the phase shifter in the terminal receiver is arranged to cause the video amplifier to oscillate at the third harmonic of the horizontal repetition rate to provide the pattern seen in Fig. 4*c* consisting of three black bars 95, 96 and 99 and two white bars 97 and 98. Other patterns may be produced by the selection of the components of the phase shifter. If the fundamental or harmonics of the vertical sweep frequency are used, horizontal bars will appear on the screens of the monitors.

A squelch circuit is introduced to prevent noise occurring in the intermediate frequency amplifier and earlier circuits from interfering with the desired oscillation of the video amplifier. In this squelch circuit the negative voltage developed when the grid of the output stage of the video amplifier conducts due to the oscillations is applied to a stage of the intermediate frequency amplifier other than that from which the A. G. C. voltage is derived to cut it off and so prevent any noise from interfering with the desired oscillations.

Even with this precaution, a clear pattern may not appear on the monitor screens when many such relays are involved. Under these circumstances a neon light indicator is used. This indicator 100 is shown in Fig. 2. It comprises a series circuit consisting of a capacitor 102 and an inductor 101. In each such indicator each of these circuits is resonant at the frequency characteristic of one of the stations in the relay chain. A neon light or other gaseous discharge device 103 is connected across the capacitor 102 in each such resonant circuit. The output of the video amplifier is applied to all these circuits through a capacitor 104 and a normally-open switch 105 that serves to disable the indicator when the chain is working normally. A unidirectional voltage from a source 106 is applied across a voltage divider comprising two resistors 107 and 108 with a tap, preferably adjustable, connected to the series resonant circuits. This voltage is adjusted below that needed to cause the neon bulb 103 to light. When a voltage at the resonant frequency of one of the series resonant circuits appears across the capacitor 102, the total voltage is sufficient to cause the neon bulb 103 to light, indicating the last relay in the chain that is producing a signal. Thus the operator can tell at a glance which station has failed and concentrate on getting this station back in operation, thus cutting down the outage time for the relay chain.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a communication chain of relay stations each having a receiver and transmitter with the output of the receiver modulating the output of the transmitter, amplifying means in said receiver, means for applying the output of said amplifier to the input of said amplifier when the input to said receiver is below a given value, phase shifting means in said feedback path to cause said amplifier to oscillate at a predetermined frequency, means for modulating the output of said transmitter with the output of said receiver and means in the receiver of a succeeding station of the chain for indicating the frequency at which the amplifier oscillates.

2. In a communication chain of relay stations for transmitting a television signal each having a receiver and transmitter with the output of the receiver modulating the output of the transmitter, amplifying means in said receiver, means for applying the output of said amplifier to the input of said amplifier when the input to said receiver is below a given value, phase shifting means in said feedback path to cause said amplifier to oscillate at a predetermined frequency, means for modulating the output of said transmitter with the output of said receiver and means in the receiver of a succeeding station of the chain for indicating the frequency at which the amplifier oscillates.

3. In a communication chain of relay stations each having a receiver and transmitter with the output of the receiver modulating the output of the transmitter, video amplifying means in said receiver, means for applying the output of said video amplifier to the input of said amplifier when the input to said receiver is below a given value, phase shifting means in said feedback path to cause said amplifier to oscillate at a predetermined frequency, means for modulating the output of said transmitter with the output of said receiver and means in the receiver of a succeeding station of the chain for indicating the frequency at which the amplifier oscillates.

4. In a communication chain of relay stations each having a receiver and transmitter with the output of the receiver modulating the output of the transmitter, amplifying means in said receiver, means for applying the output of said amplifier to the input of said amplifier when the input to said receiver is below a given value, comprising an electron discharge device normally biased to cut-off by a voltage derived from the reference signal, phase shifting means in said feedback path to cause said amplifier to oscillate at a predetermined frequency, means for modulating the output of said transmitter with the output of said receiver and means in the receiver of a succeeding station of the chain for indicating the frequency at which the amplifier oscillates.

5. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, phase shifting means in said feedback path to cause said amplifier to oscillate at a predetermined frequency, means for modulating the output of said transmitter with the output of said receiver and means in the receiver of a succeeding station of the chain for indicating the frequency at which the amplifier oscillates.

6. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, phase shifting means in said feedback path to cause said amplifier to oscillate at a frequency that is an integral multiple of one of the sweep frequencies of the video signal, means for modulating the output of said transmitter with the output of said receiver and cathode ray tube means in the receiver of a succeeding station of the chain for indicating the frequency at which the amplifier oscillates.

7. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, phase shifting means in said feedback path to cause said amplifier to oscillate at a predetermined frequency that is an integral multiple of the horizontal sweep frequency of the video signal, means for modulating the output of said transmitter with the output of said receiver and means in the receiver of a succeeding station of the chain for indicating the frequency at which the amplifier oscillates.

8. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, phase shifting means in said feedback path to cause said amplifier to oscillate at a predetermined frequency that is an integral multiple of the vertical sweep frequency of the video signals, means for modulating the output of said transmitter with the output of said receiver and means in the receiver of a succeeding station of the chain for indicating the frequency at which the amplifier oscillates.

9. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a frequency that is an integral multiple of one of the sweep frequencies of the video signal, means for modulating the output of said transmitter with the output of said receiver and means in the receiver of a succeeding station of the chain for indicating the frequency at which the amplifier oscillates.

10. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a predetermined frequency that is an integral multiple of the horizontal sweep frequency of the video signal, means for modulating the output of said transmitter with the output of said receiver and means in the receiver of a succeeding station of the chain for indicating the frequency at which the amplifier oscillates.

11. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a predetermined frequency that is an integral multiple of the vertical sweep frequency of the video signals, means for modulating the output of said transmitter with the output of said receiver and receiver means in the receiver of a succeeding station of the chain for indicating the frequency at which the amplifier oscillates.

12. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a frequency that is an integral multiple of one of the sweep frequencies of the video signal, means for modulating the output of said transmitter with the output of said receiver and cathode ray tube means in the receiver of a succeeding station of the chain for indicating the frequency at which the amplifier oscillates.

13. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a predetermined frequency that is an integral multiple of the horizontal sweep frequency of the video signal, means for modulating the output of said transmitter with the output of said receiver and cathode ray tube means in the receiver of the next station of the chain for indicating the frequency at which the amplifier oscillates.

14. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a predetermined frequency that is an integral multiple of the vertical sweep frequency of the video signals, means for modulating the output of said transmitter with the output of said receiver and cathode ray tube means in the receiver of a succeeding station of the chain for indicating the frequency at which the amplifier oscillates.

15. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a frequency that is an integral multiple of one of the sweep frequencies of the video signal, means for modulating the output of said transmitter with the output of said receiver and means in the receiver of a succeeding station of the chain for indicating the frequency at which the amplifier oscillates comprising a plurality of series resonant circuits each resonant at the frequency at which the video amplifier of each receiver can be made to oscillate comprising an inductance and a capacitor with a gaseous discharge device connected across the capacitor.

16. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage drived from the reference signal, phase shifting means in said feedback path to cause said amplifier to oscillate at a predetermined frequency that is an integral multiple of the horizontal sweep frequency of the video signal, means for modulating the output of said transmitter with the output of said receiver and means in the receiver of a succeeding station of the chain for indicating the frequency at which the amplifier oscillates comprising a plurality of series resonant circuits each resonant at the frequency at which the video amplifier of each receiver can be made to oscillate comprising an inductance and a capacitor with a gaseous discharge device connected across the capacitor.

17. In a communication chain of relay stations for transmitting a television signal each having a receiver and transmitter with the output of the receiver modulating the output of the transmitter, video amplifying means in said receiver, means for applying the output of said video amplifier to the input of said amplifier when the input to said receiver is below a given value, comprising an electron discharge device normally biased to cut-off by a voltage derived from the reference signal, phase shifting means in said feedback path to cause said amplifier to oscillate at a predetermined frequency that is an integral multiple of the vertical sweep frequency of the video signals, means for modulating the output of said transmitter with the output of said receiver and means in the receiver of a succeeding station of the chain for indicating the frequency at which the amplifier oscillates comprising a plurality of series resonant circuits each resonant at the frequency at which the video amplifier of each receiver can be made to oscillate comprising an inductance and a capacitor with a gaseous discharge device connected across the capacitor.

References Cited in the file of this patent

UNITED STATES PATENTS

| | | |
|---|---|---|
| 2,257,094 | Goldstine | Sept. 30, 1941 |
| 2,296,384 | Hansell | Sept. 22, 1942 |
| 2,524,861 | Wallace | Oct. 10, 1950 |